3,188,279
MALTING PROCESS USING CARBONYL-
CONTAINING COMPOUNDS
Eric Kneen, Elm Grove, John G. Fleckenstein, Brookfield, and Lawrence D. Beckord, Elm Grove, Wis., assignors to Kurth Malting Company, Milwaukee, Wis., a corporation of Wisconsin
No Drawing. Filed May 13, 1963, Ser. No. 280,118
16 Claims. (Cl. 195—70)

This application is concerned with the production of malt. More particularly, this invention is concerned with a novel process of producing malt in high yields by economical means.

Many cereal grains are malted for use in the brewing and distilling industries, as well as for use in foodstuffs. Among the grains that are so malted are barley, wheat, rice, rye, oats, and various other cereal grains such as millet and sorghum. The most important of these, of course, is malted barley.

The production of malt from cereal grains generally comprises four steps. In the first step the harvested grain is stored so as to build up its germinating capacity. This usually requires from thirty to sixty days from the harvest time.

In the second step the cereal grain is steeped in water. The steeping generally requires one to three days in water at about 50 to 65° F. to achieve penetration of the water into the cereal grain. After the moisture content has reached the desired limit, and before the kernels begin to germinate significantly, steeping is considered complete.

In the third step, the steeped cereal grain is germinated. Careful control of temperature, moisture and oxygen supply is maintained to achieve the proper germination. Normally the growth starts slowly at the embryo or germ end of the kernels the first day with growth being accelerated the second day. Germinating barley kernels begin to "chit" at the base of the kernel by showing a white tip. Rootlets then grow outwardly away from the tip. The acrospire also starts from the base of the kernel and grows under the hull towards the top end of the kernel. During germination, heat and carbon dioxide are given off and are removed by aeration. From the experience of many years of malting, it has been determined that the germinating grain should be maintained at a temperature of about 60 to 70° F. By the time the acrospire has grown from about three-quarters to the full length of the kernel, it is generally considered that the enzymatic system of the cereal grain has been developed and conditioned and that the product is then malt.

In the fourth step the germinated green malt is kilned to reduce its moisture content and to stop further growth. The dried malt is then cleaned and stored. The cleaning usually removes the rootlets, loose hulls and broken kernels.

Malt differs in a number of significant respects from the cereal grain used. With regard to barley malt, it contains less moisture and is more suitable for storing and grinding than barley grain. Also, the endosperm of the malt is mellow compared with the hard endosperm of the original barley kernel and the enzymatic values of the malt are greatly increased compared to those of the original barley grain. The barley malt has flavor and aroma and is readily extracted and converted. Similar conversions take place in the malting of other cereal grains such as oats, wheat and rye, or legumes.

Losses in the malting operation take place in every step. Thus, there is a loss during steeping of about 1%, a loss of about 5 to 8% during germination through formation of carbon dioxide and water, plus about a 3 to 5% loss in weight in rootlets and loose husks. There is also a loss in moisture due to drying. The average malting yield with normal malting is in the range of 90–92% (dry weight of malt to dry weight of barley). Any methods or procedures which reduce or eliminate any of these losses during malting, without lowering the efficiency or being more costly than the gain achieved, is clearly desired in the malting process. Of course, it is desirable that any such improvements which reduce losses result in the production of malt having properties and characteristics suitable for the intended uses.

Gibberellic acid has been used in the malting process to enhance growth but its use is limited because the recoveries of malt obtained are reduced. The increased growth induced by gibberellic acid generally increases losses by respiration and rootlet growth and these losses are not entirely overcome by the reduction in malting time or other gains.

It has been found, according to the subject invention, that cereal grains can be malted and good recoveries of malt with excellent industrial use properties obtained by subjecting the grain to the action of a small amount of a non-acidic carbonyl

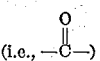

containing compound in conjunction with a small amount of gibberellic acid in the period from harvesting the grain to a time after steeping and before significant germination of the grain is substantially completed.

By "harvesting" as used herein is meant that time right after the grain kernels are seperated from the straw and gathered together for appropriate handling.

The carbonyl-containing compounds suitable for practicing the malting process of this invention are not seemingly limited to any narrow type or class of such compounds. It appears that any organic carbonyl-containing compound which is non-acidic has the capacity when used in an effective but not excessive amount in conjunction with gibberellic acid to increase the malting yields significantly above those obtained without either gibberellic acid or a carbonyl-containing compound or both. In addition, the increased yields are obtained simultaneously with alpha-amylase and modification values which are very satisfactory for industrial uses.

The non-acidic carbonyl-containing compounds which art particularly useful in this invention are the aldehydes, ketones, esters and metal salts. Some of the aldehydes, ketones, esters and metal salts which can be used may be represented by the formulas

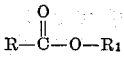

and

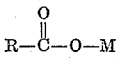

in which M represents a metal such as an alkali metal or alkaline earth metal, including sodium, potassium, calcium and magnesium, and R and $R_1$ are the same or different acyclic or cyclic groups, including mixed acyclic and cyclic groups such as (a) alkyl groups, including the lower and higher alkyls, such as methyl, ethyl, propyl, butyl, pentyl and hexyl;

(b) alkenyl groups, including the lower and higher alkenyls, such as allyl and crotyl;

(c) alkynyl groups including the lower and higher alkynyls such as propargyl;

(d) aryl groups such as phenyl and naphthyl;

(e) aralkyl groups, particularly phenyl-lower alkyl groups such as benzyl, phenethyl and phenylpropyl;

(f) aralkenyl groups, particularly phenyl-lower alkenyl groups such as cinnamyl and 2-phenyl-4-penten-2;

(g) cycloalkyl groups such as cyclopropyl, cyclopentyl, cyclohexyl and cycloheptyl; and (h) cycloalkyl-alkyl groups such as beta-cyclopentylethyl.

Such groups are to be considered only representative, since many other carbonyl-containing compounds containing other groups are suitable. In addition, one or more of a wide variety of substituents can be present such as halo, nitro, and ether groups.

The organic carbonyl-containing compounds which are, in general, quite useful in this invention are those which are nonacidic, and also desirably nonbasic, and which consist of oxygen, carbon and hydrogen atoms, and a metal atom in the case of the salts. However, nitrogen, sulfur and halogen atoms can also be present provided no adverse effects result therefrom.

Although the presence of one carbonyl group is required for activity, compounds can also be used containing two or more carbonyl groups. Regardless of the number of carbonyl groups present it is not the intention to employ, or include, in this invention any such compounds which are ineffective or unsatisfactory for the production of malt in increased yields capable of industrial uses. The greatest number of useful compounds have molecular weights below 200, and generally not above 130.

Some specific carbonyl-containing compounds which have been found useful in this invention are formaldehyde, acetaldehyde, benzaldehyde, salicyl aldehyde, phenyl acetaldehyde, cinnamaldehyde, croton aldehyde, furfural, acetophenone, benzophenone, 1-indanone, acetone, methyl ethyl ketone, methyl n-amyl ketone, methyl isobutyl ketone, methyl n-hexyl ketone, methyl isopropyl ketone, allyl formate, sodium benzoate, ethyl vanillate, calcium salicylate, phenyl salicylate, butyrolactone, methyl acetate, ethyl acetate, n-propyl acetate, butyl acetate, benzyl acetate, phenyl acetate, phenethyl acetate and allyl acetate.

The carbonyl-containing compound can be added to the grain at any time after harvesting and before significant germination of the grain is substantially completed.

Addition of the carbonyl-containing compound to the dry grain before steeping usually requires an extended period before the carbonyl-containing compound achieves its effect although the time required can vary from compound to compound and with the concentration of the compound. In general, anywhere from 2 weeks to 4 months storage after application of the carbonyl-containing compound before putting the grain in process is desired to obtain appreciable increases in malting yield. The extended time needed is considered due to the low moisture content of the dry grain.

The carbonyl-containing compound can also be added in the steeping step but because of the diluting effect of the water rather large amounts of the compound are required.

The presently considered most desirable period in which to add the carbonyl-containing compound is after steep-out and before significant germination of the grain has taken place. The carbonyl-containing compound can also be added during the germination phase itself but, of course, with decreased effectiveness because of the growth and respiration which has already taken place.

The activity of the carbonyl-containing compounds, in conjunction with gibberellic acid, varies considerably and therefore the effective concentration range for each compound is determined by titration methods using different levels of compound. Within the effective concentration range for each compound the higher amounts of carbonyl-containing compound give higher yields of malt. However, the amount of compound used is to be correlated with the alpha-amylase and modification desired in the malt. Too large amounts of the carbonyl-containing compound can lower the alpha-amylase and modification values unduly and render the product unusable as malt for many purposes. Insufficient amounts of the carbonyl-containing compound will lead to little, or insignificant, increases in malt yield and thus the benefits of the invention would not be realized. When added durng steeping about 5 to 30 times more of the carbonyl-containing compound is needed than when added after steep-out to obtain an equivalent effect although the amount can vary considerably outside of this range with certain of the compounds.

Because of the wide variation in effectiveness of the carbonyl-containing compounds it is only possible to indicate broadly the concentration range in which most suitable compounds will fall. Thus, the most useful compounds will require about 20 to 60,000 parts of carbonyl-containing compound by weight per million parts by weight of dry grain (barley) with the higher amounts being needed when all or part of the compound is added during steeping.

The effectiveness of the treatment can be enhanced by couching the grain under nonaerating conditions after the addition of the carbonyl-containing compound. This can be done when the compound is added after steep-out, or during the steeping step by partially steeping the grain, draining it, adding the compound and couching the grain before completing the steeping.

The carbonyl-containing compound can be added under conditions of temperature normally employed in storing the grain and in the subsequent malting process.

The gibberellic acid can be applied to the grain and stored before being malted. Although the gibberellic acid can be applied during steeping, excessive amounts of this valuable and expensive substance would be lost in the steep water. The optimum time to apply the gibberellic acid is after steeping is completed and the grain has been drained but before significant germination has begun (usually within 24 hours after steep-out).

The amount of gibberellic acid required in the process of this invention is very small and generally need not exceed 3 parts per million based upon the dry weight (0% moisture) of the cereal grain being malted. As little as about 0.05 part per million are useful but, in general, it is recommended that about 0.10 to 1.5 parts per million of gibberellic acid be used per dry weight of cereal grain being malted. The gibberellic acid can be applied conveniently by means of a solution sprayed on the grain with suitable mixing to achieve a substantially uniform application of the gibberellic acid to the grain.

The term "gibberellic acid" as used herein and in the claims is intended to include the free acid as well as chemical equivalents and derivatives thereof provided they function satisfactorily in the process, such as the alkali metal and alkaline earth metal salts thereof, and particularly the sodium and potassium salts, alkyl esters thereof and particularly the methyl, ethyl, propyl and butyl esters, as well as acyloxy derivatives thereof, such as acetyl gibberellic acid.

After the carbonyl-containing compound and the gibberellic acid are applied, the cereal grain can then be subjected to routine germinating conditions for a period sufficiently long to achieve modification of the grain into an acceptable malt characterized by a suitable enzyme capability, as well as other properties generally normal to malt, such as color, aroma, and the like. This germination or modification, usually requires a period of about three to five days. However, it is advisable that the germination time be held to a minimum so that modification is achieved before the stunned germ becomes revitalized and undesirable growth appears. Minimizing the germination time also avoids any adverse effect which growth of microorganisms might otherwise induce although a bacteriostatic agent, such as sodium bisulfite or sodium metasulfite, can be used on the germinating grain to control microflors. The germination conditions of moisture, temperature and aeration are those generally employed in the germination step in conventional malting processes although in the process of this invention the germination period in general is usually shorter, and often by as much as one day.

The germination results in a malt free, or substantially free, of rootlets, and which has been produced with a minimum of respiration, including a minimum production of carbon dioxide. As a result, less cooling is required during germination than in other malting processes. This in itself results in an economy, as does, of course, the production of malt without the weight loss due to respiration and rootlet formation.

Following the germination period, the green malt is kilned with the generally acceptable conditions of time and temperature so as to produce a malt having a moisture content of about 4 to 6%. The malt so obtained has good modification and good alpha-amylase values and is suitable for use in the brewing and distilling industries as well as in foodstuffs. Beer made from such malt has excellent aroma and color and is characterized by a pleasing palate.

While temperature below about 70° F. are used in commercial malting processes, it has been found that by heating the grain being malted to a temperature from about 80° F. to about 160° F. while also using gibberellic acid and a carbonyl-containing compound that the yields of malt can be maintained high while using less of the carbonyl-containing compound than would otherwise be the case.

The following examples are presented to illustrate the invention. In these examples alpha-amylase is reported in units determined by Methods of Analysis of the American Society of Brewing Chemists, 6th Ed., page 169 (1958), American Society of Brewing Chemists, Madison 5, Wisconsin.

The modification index values reported in the examples is a measure of the conversion of the barley, or other grain, to malt. The higher the value, the greater is the conversion into malt. Malts have modification index values up to 50 (and higher) while barley has a value less than 2. The modification index provides similar information as coarse-fine grind extract difference determinations. An approximate comparison between these values is shown in the following table.

| Modification index: | Coarse-fine extract difference |
|---|---|
| 65 | 1.0 very well modified. |
| 50 | 1.8. |
| 40 | 2.5. |
| 35 | 3.0. |
| 30 | 3.7. |
| 20 | 5.5. |
| 15 | 7.5 poorly modified. |

$$\text{The modification index} = 100 \times \frac{1}{\text{TCA viscosity}}$$

TCA viscosity is determined as follows:
A 25 gm. sample of malt is finely ground (Miag Cone Mill, setting 95). A flask is heated to approximately 68° C., 25 mls. of 40% trichloroacetic acid is added and then 200 mls. of hot tap water. The mixture is cooled to 68° C., the 25 gm. of malt added and the mixture blended 2 minutes and filtered.

A viscosimeter is cooled to 20° C. and a 10 ml. sample of the malt dispersion is added. After cooling to 20° C. the running time is recorded. This is then repeated.

The water time of the viscosimeter is measured by adding 10 ml. of distilled water to a clean, drained viscosimeter and the running time measured at 20° C.

The viscosity is then calculated as follows:

$$\text{TCA viscosity} = \frac{\text{Running time of malt solution}}{\text{Running time of water}}$$

EXAMPLE 1

*The effect of various alkyl acetates combined with gibberellic acid*

500 g. barley (dry).
Steep to 40–41% moisture, drain, treat with 0.5 p.p.m. gibberellic acid and the indicated level of acetate, couch for 24 hours at 60–62° F. and then place under malting condition at 60–62° F. for an additional 4 days before kilning. Moisture content in malting adjusted to 44–45% at steep-out and during the first day of malting.

| Compound | Concentration (p.p.m.)[1] | Alpha-amylase (units) | Modification Index | Malting Yield (percent) |
|---|---|---|---|---|
| Methyl acetate | 1,000 | 30 | 52 | 94.5 |
| Do | 2,000 | 22 | 50 | 96.5 |
| Do | 4,000 | <1 | <5 | 97.5 |
| Ethyl acetate | 1,000 | 62 | 52 | 92.4 |
| Do | 2,000 | 50 | 55 | 94.8 |
| Do | 2,500 | 38 | 30 | 96.5 |
| Do | 4,000 | 4 | 6 | 97.0 |
| n-Propyl acetate | 2,000 | 35 | 48 | 96.2 |
| Butyl acetate | 1,500 | 36 | 45 | 95.8 |
| Benzyl acetate | 1,500 | 22 | 39 | 95.6 |
| Phenyl acetate | 1,000 | 26 | 46 | 97.2 |
| Phenethyl acetate | 1,000 | 32 | 51 | 94.5 |
| Allyl acetate | 200 | 24 | 36 | 95.3 |
| Control malt (no treatment) | | 42 | 34 | 91.6 |
| Control malt (.5 p.p.m. gibberellic acid) | | 52 | 46 | 90.0 |

[1] Concentration is p.p.m. in terms of dry barley treated—v./w. for liquid compounds and w./w. for solid compounds.

The data in the example show that all the acetates combined with gibberellic acid, gave markedly increased malt recovery with satisfactory alpha-amylase and modification.

The effective level varied with each individual compound from as high as 2500 p.p.m. for ethyl acetate to as low as 200 p.p.m. for allyl acetate, but for any one compound it was possible, by titration procedures, to select an appropriate level. The influence of concentration is illustrated by the several levels with both methyl and ethyl acetate.

EXAMPLE 2

*The effect of a variety of esters and salts, combined with gibberellic acid*

500 g. barley (dry).
Steeping and treatment conditions as in Example 1, applying 0.5 p.p.m. gibberellic acid and the indicated compound at steep-out.

| Compound | Concentration (p.p.m.)[1] | Alpha-amylase (units) | Modification Index | Malting Yield (percent) |
|---|---|---|---|---|
| Allyl formate | 100 | 16 | 35 | 97.3 |
| Sodium benzoate | 1,000 | 31 | 37 | 95.5 |
| Ethyl vanillate | 1,000 | 27 | 42 | 95.7 |
| Calcium salicylate | 1,000 | 19 | 30 | 96.8 |
| Phenyl salicylate | 2,000 | 27 | 32 | 93.7 |
| Butyrolactone | 1,500 | 20 | 38 | 96.8 |

[1] For liquids v./w., and for solids w./w., based on dry barley.

The data of this example show a marked increase in malting yield over the normal 90–92% while still permitting good enzyme development and modification.

EXAMPLE 3

*The effect of aldehydes combined with gibberellic acid*

500 g. barley (dry).
Steeping and treatment conditions as in Example 1, applying 0.5 p.p.m. gibberellic acid and the indicated compound at steep-out.

| Compound | Concentration (p.p.m.)[1] | Alpha-amylase (units) | Modification Index | Malting Yield (percent) |
|---|---|---|---|---|
| Formaldehyde | 400 | 52 | 52 | 93.3 |
| Do | 800 | 39 | 48 | 95.3 |
| Do | 1,100 | 28 | 34 | 97.0 |
| Do | 1,600 | 14 | 7 | 98.0 |
| Do | 4,000 | trace | <5 | 98.5 |
| Acetaldehyde | 1,000 | 61 | 45 | 92.4 |
| Do | 1,500 | 58 | 50 | 93.9 |
| Do | 2,000 | 45 | 51 | 96.6 |
| Do | 4,000 | 4 | 6 | 98.0 |
| Do | 15,000 | trace | <5 | 98.5 |
| Benzaldehyde | 1,000 | 26 | 31 | 95.0 |
| Salicyl aldehyde | 300 | 30 | 26 | 95.2 |
| Phenyl acetaldehyde | 2,000 | 30 | 40 | 94.0 |
| Cinnamaldehyde | 1,000 | 31 | 25 | 93.9 |
| Croton aldehyde | 150 | 31 | 46 | 95.5 |
| Furfural | 2,300 | 21 | 28 | 94.0 |
| Do | 3,100 | 11 | 17 | 95.0 |
| Control (no gibberellic acid) | | 56 | 37 | 92.1 |
| Control (0.5 p.p.m. gibberellic acid) | | 69 | 49 | 91.0 |

[1] For liquids v./w., and for solids w./w., based on dry barley.

The data in the example show that, at a selected concentration, all the aldehydes used improve the malting yield. Compounds such as croton aldehyde and salicyl aldehyde are effective at levels as low as 150 to 300 p.p.m. while an aldehyde such as acetaldehyde at 2000 p.p.m. gives excellent enzyme activity and modification with a high malting yield of 96.4%, and 1100 p.p.m. formaldehyde gives acceptable alphase-amylase and modification with a malting yield of 97.0%.

EXAMPLE 4

*The effect of ketones combined with gibberellic acid*

500 g. barley (dry).

Steeping and treatment conditions as in Example 1, applying 0.5 p.p.m. gibberellic acid and the indicated compound at steep-out.

| Compound | Concentration (p.p.m.)[1] | Alpha-amylase (units) | Modification Index | Malting Yield (percent) |
|---|---|---|---|---|
| Acetophenone | 2,000 | 27 | 50 | 94.0 |
| Benzophenone | 1,500 | 13 | 44 | 94.2 |
| 1-indanone | 1,000 | 19 | 49 | 94.8 |
| Acetone | 60,000 | 39 | 55 | 94.7 |
| Methyl ethyl ketone | 30,000 | 34 | 58 | 95.0 |
| Methyl n-amyl ketone | 2,000 | 27 | 46 | 95.8 |
| Methyl isobutyl ketone | 10,000 | 43 | 54 | 94.1 |
| Methyl n-hexyl ketone | 2,000 | 34 | 54 | 93.3 |
| Do | 6,000 | 16 | 34 | 96.3 |
| Methyl isopropyl ketone | 6,000 | 45 | 43 | 93.7 |
| Do | 10,000 | 27 | 37 | 95.5 |

[1] On v./w. basis, or w./w. basis.

The data of this example show that a variety of ketones, when combined with gibberellic acid, cause substantial improvement in malting yield coincident with the retention of the valuable malt properties such as enzyme production and kernel modification.

There is considerable variation in effectiveness, from the 60,000 p.p.m. of acetone required to the low level of 1,000 p.p.m. effective for 1-indanone. However, they all improve the malting yield over the normal 91–92% for untreated malt with the degree of improvement depending on the concentration of each individual compound employed.

The foregoing detailed description has been given for clearness of understanding only, and no unnecessary limitations should be understood therefrom, as modifications will be obvious to those skilled in the art.

What is claimed is:

1. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 60,000 parts by weight of a nonacidic organic carbonyl-containing compound, and about 0.05 to 3 parts by weight of gibberellic acid, per million parts of dry cereal grain, to the grain in the period from harvesting the grain to a time after steep-out and before germination of the grain is substantially completed, the amount of said carbonyl-containing compound used being sufficient to significantly increase the malting yield and give a malt with an alpha-amylase and modification values of industrial utility.

2. The process of claim 1 in which the grain is barley.

3. The process of claim 1 in which most of the carbonyl-containing compound is added after steep-out.

4. The process of claim 1 in which the carbonyl-containing compound has a molecular weight below 130.

5. The process of claim 1 in which the carbonyl-containing compound consists of carbon, oxygen and hydrogen atoms.

6. The process of claim 9 in which the carbonyl-containing compound is a lower alkyl ester of a lower carboxylic acid.

7. The process of claim 9 in which the carbonyl-containing compound is a lower alkenyl ester of a lower carboxylic acid.

8. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 60,000 parts by weight of a nonacidic organic carbonyl-containing compound of the formula

wherein R and $R_1$ each represent an alkyl group, and about 0.05 to 3 parts by weight of gibberellic acid, per million parts of dry cereal grain to the grain in the period from harvesting the grain to a time after steep-out and before germination of the grain is substantially completed, the amount of said carbonyl-containing compound used being sufficient to significantly increase the malting yield and give a malt with alpha-amylase and modification values of industrial utility.

9. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 60,000 parts by weight of a nonacidic organic carbonyl-containing compound of the formula

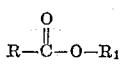

in which R and $R_1$ each represent an alkyl group, and about 0.05 to 3 parts by weight of gibberellic acid, per million parts of dry cereal grain to the grain in the period from harvesting the grain to a time after steep-out and before germination of the grain is substantially completed, the amount of said carbonyl-containing compound used being sufficient to significantly increase the malting yield and give a malt with alpha-amylase and modification values of industrial utility.

10. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 60,000 parts by weight of an alkyl aldehyde and about 0.05 to 3 parts by weight of gibberellic acid, per million parts of dry cereal grain to the grain in the period from harvesting the grain to a time after steep-out and before germination of the grain is substantially completed, the amount of said carbonyl-containing compound used being sufficient to significantly increase the malting yield and give a malt with alpha-amylase and modification values of industrial utility.

11. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 60,000 parts by weight of an alkenyl aldehyde and about 0.05 to 3 parts by weight of gibberellic acid, per million parts of dry cereal grain to the grain in the period from harvesting the grain to a time after steep-out and before germination of the grain is substantially completed, the amount of said carbonyl-containing compound used being sufficient to significantly increase the malting yield and give a malt with alpha-amylase and modification values of industrial utility.

12. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 60,000 parts by weight of a phenyl-lower alkyl-aldehyde and about 0.05 to 3 parts by weight of gibberellic acid, per million parts of dry cereal grain to the grain in the period from harvesting the grain to a time after steep-out and before germination of the grain is susbtantially completed, the amount of said carbonyl-containing compound used being sufficient to significantly increase the malting yield and give a malt with alpha-amylase and modification values of industrial utility.

13. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 60,000 parts by weight of a compound of the formula $$R-\overset{\overset{O}{\|}}{C}-O-M$$

in which R is alkyl and M is an alkali metal and about 0.05 to 3 parts by weight of gibberellic acid, per million parts of dry cereal grain to the grain in the period from harvesting the grain to a time after steep-out and before germination of the grain is substantially completed, the amount of said carbonyl-containing compound used being sufficient to significantly increase the malting yield and give a malt with alpha-amylase and modification values of industrial utility.

14. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 60,000 parts by weight of a compound of the formula $$R-\overset{\overset{O}{\|}}{C}-O-M$$

in which R is alkyl and M is an alkaline earth metal and about 0.05 to 3 parts by weight of gibberellic acid, per million parts of dry cereal grain to the grain in the period from harvesting the grain to a time after steep-out and before germination of the grain is susbtantially completed, the amount of said carbonyl-containing compound used being sufficient to significantly increase the malting yield and give a malt with alpha-amylase and modification values of industrial utility.

15. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 60,000 parts by weight of a compound of the formula $$R-\overset{\overset{O}{\|}}{C}-O-R_1$$

in which R is a lower alkenyl and $R_1$ is lower alkyl and about 0.05 to 3 parts by weight of gibberellic acid, per million parts of dry cereal grain to the grain in the period from harvesting the grain to a time after steep-out and before germination of the grain is substantially completed, the amount of said carbonyl-containing compound used being sufficient to significantly increase the malting yield and give a malt with alpha-amylase and modification values of industrial utility.

16. In the process of malting a cereal grain which employs steeping grain until it acquires a moisture content suitable for germination, germinating the steeped grain under suitable conditions of aeration and moisture until green malt is produced and kilning the green malt, the improvement which comprises applying about 20 to 60,000 parts by weight of an ester of a carboxylic acid and about 0.05 to 3 parts by weight of gibberellic acid, per million parts of dry cereal grain to the grain in the period from harvesting the grain to a time after steep-out and before germination of the grain is susbtantially completed, the amount of said carbonyl-containing compound used being sufficient to significantly increase the malting yield and give a malt with alpha-amylase and modification values of industrial utility.

References Cited by the Examiner
UNITED STATES PATENTS
2,991,231   7/61   Lucht et al. _____ 195—71
FOREIGN PATENTS
811,374   4/59   Great Britain.

A. LOUIS MONACELL, *Primary Examiner.*
ABRAHAM H. WINKELSTEIN, *Examiner.*